(12) United States Patent
Sasatani et al.

(10) Patent No.: US 9,887,950 B2
(45) Date of Patent: *Feb. 6, 2018

(54) VALIDATING E-MAILS USING MESSAGE POSTING SERVICES

(71) Applicant: International Business Machines Corporation, Armonk, NY (US)

(72) Inventors: Yohkichi Sasatani, Yokohama (JP); Katsuya Shibutani, Yamato (JP); Ichiro Takiguchi, Kawasaki (JP); Yoshiki Yatsu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,681

(22) Filed: Jun. 28, 2016

(65) Prior Publication Data

US 2016/0359892 A1 Dec. 8, 2016

Related U.S. Application Data

(63) Continuation of application No. 14/728,186, filed on Jun. 2, 2015.

(51) Int. Cl.
 *H04L 12/58* (2006.01)
 *G06F 17/30* (2006.01)
 *H04L 29/06* (2006.01)

(52) U.S. Cl.
 CPC ........ *H04L 51/30* (2013.01); *G06F 17/30371* (2013.01); *H04L 51/04* (2013.01);
 (Continued)

(58) Field of Classification Search
 CPC ... G06F 17/30371; H04L 51/30; H04L 51/04; H04L 63/1483; H04L 63/1466; H04L 63/126
 (Continued)

(56) References Cited

U.S. PATENT DOCUMENTS 7,797,443 B1 9/2010 Pettigrew et al.
8,073,912 B2 12/2011 Kaplan
(Continued)

FOREIGN PATENT DOCUMENTS

CN 103441924 A 12/2013

OTHER PUBLICATIONS

Shen et al., "Leveraging Social Networks for Effective Spam Filtering", IEEE Transactions on Computers, vol. 63, No. 11, Nov. 2014, pp. 2743-2759, © 2013 IEEE, DOI: 10.1109/TC.2013.152.
(Continued)

*Primary Examiner* — Tu Nguyen
(74) *Attorney, Agent, or Firm* — Bryan D. Wells

(57) ABSTRACT

Validation of e-mails is provided. An e-mail is received. A sender of the e-mail is determined. A message posting service account that is associated with the sender is identified. The message posting service is queried for a first hash value that corresponds to the e-mail based, at least in part, on the account. A response is received from the message posting service. Whether the account includes the first hash value is determined based, at least in part, on the response. The e-mail is or is not validated based, at least in part, on the response from the message posting service.

9 Claims, 9 Drawing Sheets

(52) U.S. Cl.
CPC ........ *H04L 63/126* (2013.01); *H04L 63/1466* (2013.01); *H04L 63/1483* (2013.01)

(58) Field of Classification Search
USPC .......................................................... 709/206
See application file for complete search history.

(56) References Cited

U.S. PATENT DOCUMENTS

| | | |
|---|---|---|
| 8,880,611 B1 | 11/2014 | Lim et al. |
| 8,924,484 B2 | 12/2014 | Wilson |
| 8,938,508 B1 | 1/2015 | McCorkendale et al. |
| 2004/0199670 A1* | 10/2004 | Garfinkel .............. H04L 63/126 709/246 |
| 2010/0318623 A1 | 12/2010 | Bloch et al. |
| 2012/0066498 A1* | 3/2012 | Engert .................... G06F 21/51 713/170 |
| 2014/0173726 A1 | 6/2014 | Varenhorst |
| 2016/0359789 A1 | 12/2016 | Sasatani et al. |

OTHER PUBLICATIONS

Sasatani et al., "Validating E-Mails Using Message Posting Services", U.S. Appl. No. 14/728,186, 39 pages, filed Jun. 2, 2015.
Appendix P, List of IBM Patents or Patent Applications Treated As Related, 2 pages, dated Jul. 19, 2016.

\* cited by examiner

```
Delivered-To: xxxxx@example.net
Received: by 192.168.20.30 with SMTP id t8csp1047231bb;
        Sat, 22 Mar 2014 19:43:18 -0700 (PDT)
X-Received: by 192.168.20.20 with SMTP id bm4mr626384491pac.50.1395842597569;
        Sat, 22 Mar 2014 19:43:17 -0700 (PDT)
Return-Path: <xxxxx@example.com>
Received: from smtp1.example.com (smtp1.example.com. [192.168.10.10])
        by mx.example.com with ESMTP id yaksi5833805pab.254.2014.03.22.19.42.16
        for <xxxxx@example.net>;
        Sat, 22 Mar 2014 19:43:17 -0700 (PDT)
Received-SPF: pass (example.com: domain of xxxxx@example.com designates 192.168.10.10 as permitted sender)
client-ip=192.168.10.10;
Authentication-Results: mx.example.com;
       spf=pass (example.com: domain of xxxxx@example.com designates 192.168.10.10 as permitted sender)
smtp.mail=xxxxx@example.com
Received: from SMTP2 ([192.168.10.200]) by smtp2.example.com with XXXXXX;
         Sat, 22 Mar 2014 19:42:16 -0700
Message-ID: <XXXXX-W5089S808100301000F2E39A7B0@xxx.xxx>
Return-Path: xxxxx@example.com
Content-Type: multipart/alternative;
        boundary="_e8e7784-46a6-40e1-8a11-a23e9aa92me3_"
From: xxxxx <xxxxx@example.com>
To: xxxxx <xxxxx@example.net>
Subject: =?iso-2022-jp?B?GyRCJY1oSVLWEsPGYrGyhC?=
Date: Sun, 23 Mar 2014 11:42:16 +0900
Importance: Normal
MIME-Version: 1.0
```

VALIDATING E-MAILS USING MESSAGE POSTING SERVICES

BACKGROUND OF THE INVENTION

The present invention relates generally to the field of electronic messaging, and more particularly to validating e-mails.

Electronic mail, most commonly referred to as email or e-mail, is a method of exchanging digital messages from an author to one or more recipients. Modern e-mail operates across the Internet or other computer networks. Some early e-mail systems required the author and the recipient to both be online at the same time, in common with instant messaging. Today's e-mail systems are based on a store-and-forward model. E-mail servers accept, forward, deliver, and store messages. Neither the users nor their computers are required to be online simultaneously; they need connect only briefly, typically to a mail server, for as long as it takes to send or receive messages.

An e-mail message generally includes at least three components, the message envelope, the message header, and the message body. The message header contains control information, including, minimally, an originator's e-mail address and one or more recipient addresses. Usually descriptive information is also added, such as a subject header field and a message submission date/time stamp.

SUMMARY

According to one embodiment of the present disclosure, a method for validating e-mails is provided. The method includes receiving, by one or more computer processors, an e-mail; determining, by one or more computer processors, a sender of the e-mail; identifying, by one or more computer processors, an account of a message posting service, wherein the account is associated with the sender; querying, by one or more computer processors, the message posting service for a first hash value corresponding to the e-mail based, at least in part, on the account; receiving, by one or more computer processors, a response from the message posting service; determining, by one or more computer processors, whether the account includes the first hash value based, at least in part, on the response; and validating, by one or more computer processors, the e-mail based, at least in part, on the response from the message posting service.

According to another embodiment of the present disclosure, a computer program product for validating e-mails is provided. The computer program product comprises a computer readable storage medium and program instructions stored on the computer readable storage medium. The program instructions include program instructions receive an e-mail; program instructions to determine a sender of the e-mail; program instructions to identify an account of a message posting service, wherein the account is associated with the sender; program instructions to query a message posting service for a first hash value corresponding to the e-mail based, at least in part, on the account; program instructions to, responsive to determining that the first hash value is posted to the account, calculate a second hash value based, at least in part, on one or more predetermined portions of the e-mail and to compare the first hash value and the second hash value; program instructions to, responsive to determining that the first hash value is equal to the second hash value, determine that the e-mail is authentic based, at least in part, on the comparison of the first and second hash values; and program instructions to, responsive to determining that the first hash value is not equal to the second hash value, determine that the e-mail has been tampered with.

According to another embodiment of the present disclosure, a computer system for validating e-mails is provided. The computer system includes one or more computer processors, one or more computer readable storage media, and program instructions stored on the computer readable storage media for execution by at least one of the one or more processors. The program instructions include program instructions to receive an e-mail; program instructions to determine a sender of the e-mail; program instructions to identify an account of a message posting service, wherein the account is associated with the sender; program instructions to query a message posting service for a first hash value corresponding to the e-mail based, at least in part, on the account; program instructions to, responsive to determining that the first hash value is posted to the account, calculate a second hash value based, at least in part, on one or more predetermined portions of the e-mail and to compare the first hash value and the second hash value; program instructions to, responsive to determining that the first hash value is equal to the second hash value, determine that the e-mail is authentic based, at least in part, on the comparison of the first and second hash values; and program instructions to, responsive to determining that the first hash value is not equal to the second hash value, determine that the e-mail has been tampered with.

BRIEF DESCRIPTION OF THE DRAWINGS

FIG. 6 depicts an example of header information of an e-mail, in accordance with an embodiment of the present disclosure.

DETAILED DESCRIPTION

Embodiments of the present disclosure will now be described in detail with reference to the drawings.

The present disclosure recognizes a need to authenticate e-mails. In general, unsolicited e-mails (i.e., spam) and spoofed e-mails are sorted out and blocked on the basis of electronic mail addresses and domain names. Depending on various settings, however, non-spam and/or authentic e-mails can be sorted out and blocked by mistake. While techniques exist for detecting falsified or spoofed e-mails (e.g., Pretty Good Privacy (PGP) and Secure/Multipurpose Internet Mail Extensions (S/MIME)), many of these techniques require that a recipient register, and update as necessary, at least one certificate for each trusted sender.

The present disclosure provides a mechanism for determining whether an e-mail that was transmitted over the internet has been tampered and/or spoofed. In various embodiments, it is not necessary to register and maintain the certificates of trusted senders. In some embodiments, however, techniques such as S/MIME are used in conjunction various aspects of the present disclosure.

Persons of ordinary skill in the art will understand that various protocols, such as Simple Mail Transfer Protocol (SMTP), Post Office Protocol (POP), and Internet Message Access Protocol (IMAP), are used to transmit electronic messages over the internet. This type of electronic message is hereinafter referred to as an "e-mail." In various embodiments, "determining whether an e-mail has been tampered with" includes not only a determination of "whether an e-mail has been tampered with" but a determination of "whether an e-mail could have been tampered with." In addition, "determining whether an e-mail is spoofed" includes not only a determination of "whether an e-mail is spoofed" but also a determination of "whether an e-mail could be spoofed."

Figure 1:
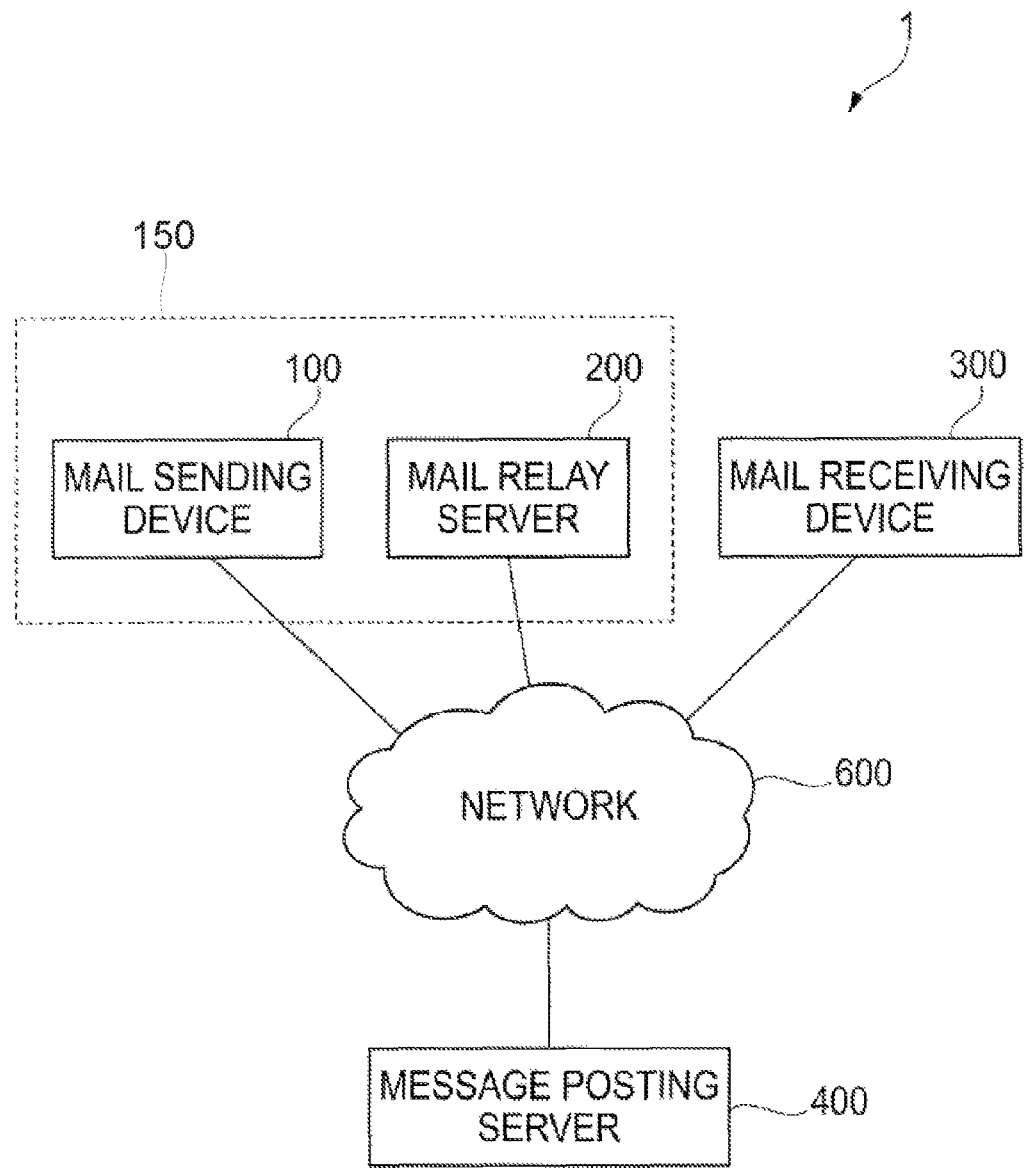
FIG. 1 is a block diagram of a computer system for validating e-mails, in accordance with an embodiment of the present disclosure.

FIG. 1 depicts a block diagram of a computer system 1, in accordance with an embodiment of the present disclosure. As shown in the figure, the computer system 1 includes a mail sending device 100, a mail relay server 200, a mail receiving device 300, a message posting server 400, and a network 600.

The mail sending device 100 is a computer connected to the network 600 and used by a sender of e-mails. The mail sending device 100 sends an e-mail addressed to the mail receiving device 300 in response to an operation by the sender. The mail sending device 100 may be a desktop PC (personal computer), a notebook PC, a tablet PC, a PDA (personal digital assistant), a smart phone, a cellular phone, or the like. The mail relay server 200 is a computer that is connected to the network 600. The mail relay server 200 relays the e-mail sent by the mail sending device 100 and posts a message to the message posting server 400. The mail relay server 200 may be a desktop PC, a workstation, or another computing device. In the embodiment depicted in FIG. 1, the mail sending device 100 and the mail relay server 200 are within the same domain 150 to indicate that the mail relay server 200 and the mail sending device 100 are owned and/or used by the same entity. In some embodiment, two or more mail sending devices are connected to the network 600. In addition, two or more mail relay servers are connected to the network 600 in some embodiments.

The mail receiving device 300 is a computer connected to the network 600 and used by a receiver of e-mails. The mail receiving device 300 receives the e-mail relayed by the mail relay server 200, and determines, on the basis of the posted message and a time of posting, whether the e-mail has been tampered with. The mail receiving device 300 may be a desktop PC, a notebook PC, a tablet PC, a PDA, smart phone, cellular phone, or another type of computing device. Is some embodiments, two or more mail receiving devices are connected to the network 600.

The message posting server 400 is a computer connected to the network 600 and used by a service provider to provide a message posting service. The message posting service may be a short message posting service, for example Twitter®. In some embodiments, the message posting service has an authentication function that uses account information, such as user IDs and passwords, to authenticate users. With the authentication function, only an authenticated user can post a message. The message posting service also records information that related to the posting of messages (e.g., the time and/or date of posting). In general, the message posting service does not allow users to modify a posted message. A message can be deleted by only a user who posted the message. In various embodiments, messages are displayed in at least one of human-readable language and machine-readable language. In some embodiments, the message posting server 400 guides the mail receiving device 300 to a web site to facilitate installation of plug-ins, add-ons, or other types of authentication programs that enable the mail receiving device to determine if an e-mail has been tampered with or spoofed.

The network 600 is a set of communication lines used for information exchange between the mail sending device 100 and the mail relay server 200, between the mail relay server 200 and the mail receiving device 300, between the mail relay server 200 and the message posting server 400, and between the mail receiving device 300 and the message posting server 400. The Internet is an example of the network 600.

Figure 2:
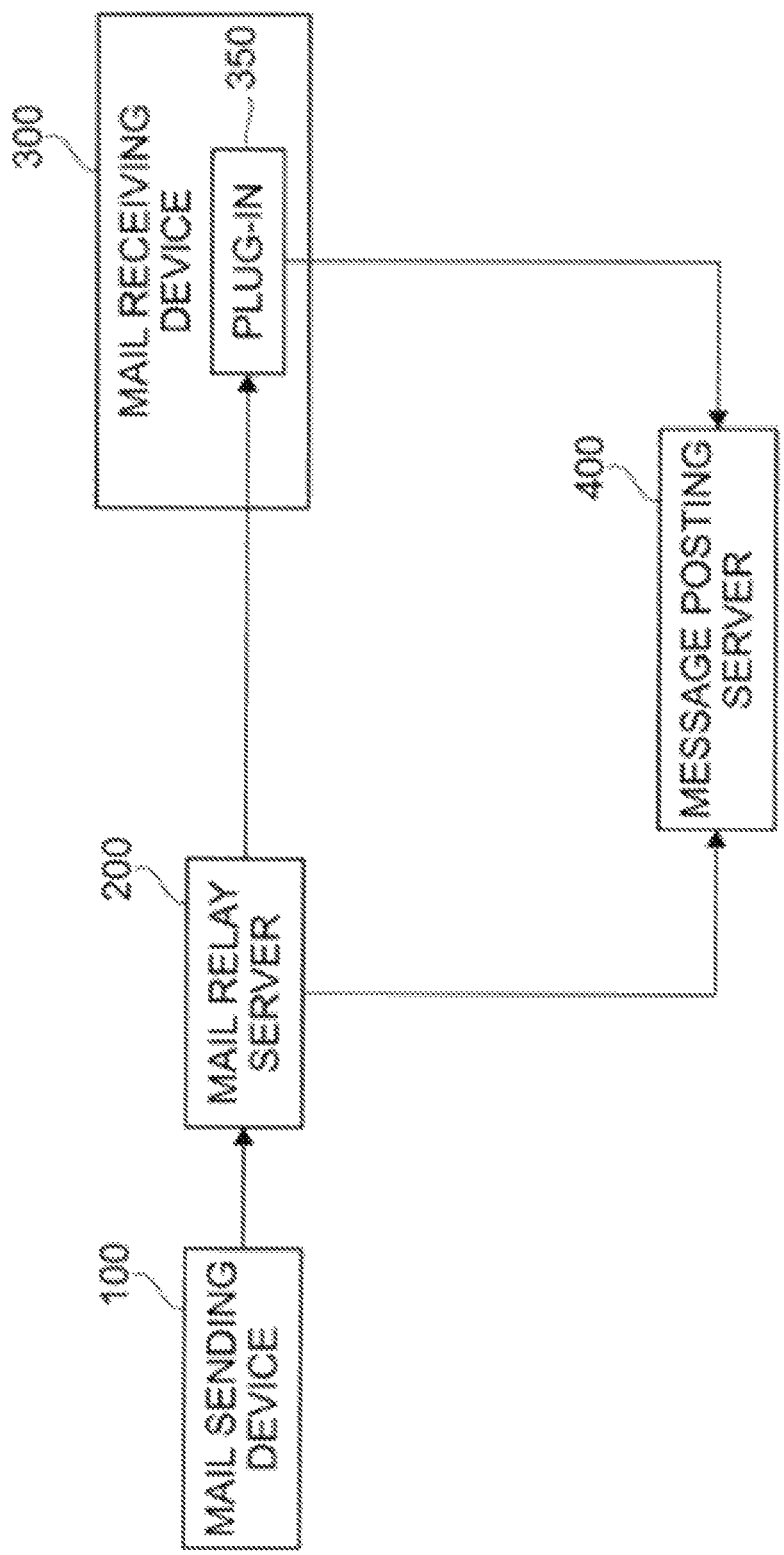
FIG. 2 is a block diagram that depicts various transfers of information within the embodiment depicted in FIG. 1, in accordance with an embodiment of the present disclosure.

FIG. 2 is a block diagram that depicts various transfers of information within the embodiment depicted in FIG. 1, in accordance with an embodiment of the present disclosure. The mail sending device 100 sends an e-mail addressed to the mail receiving device 300 in response to a request of a sender of the e-mail, and the mail relay server 200 receives the e-mail. The mail relay server 200 logs in to the message posting service on the message posting server 400 using account information of the sender and posts a hash value of a predetermined portion of the e-mail to the sender's account. In one embodiment, the predetermined portion includes the header information, the subject, and the body of the e-mail. The message posting server 400 holds the hash value after recording a time of posting. In the meantime, the mail relay server 200 sends the e-mail to the mail receiving device 300, and the mail receiving device 300 receives the e-mail.

Mail receiving device 300 determines if an e-mail has been tampered with using a plug-in (e.g., plug-in 350), an add-on, or another type of software that installed on the mail receiving device 300. In embodiments, that include the plug-in 350 that is depicted in FIG. 2, the plug-in 350 calculates a hash value of the predetermined portion of the e-mail, and compares this calculated hash value with the posted hash value. If the hash values are different from each other, the plug-in 350 determines that the e-mail has been tampered with. In some embodiments, the plug-in 350 also evaluates the difference between a time when the hash value is posted to the message posting server 400 and a time when the e-mail is received by the mail receiving device 300. If the difference exceeds a time threshold set in advance, the plug-in 350 determines that the e-mail has been tampered with. If the sender finds that an e-mail has been sent in the name of the sender using an e-mail distribution list without permission, as one example of a predetermined condition, the sender may delete the posted message which includes the hash value from the message posting server 400. To determine whether or not an e-mail has been spoofed, the plug-in 350 checks the sender's account on the message posting server 400 for the presence of the posted message, which includes the hash value of the predetermined portion of the e-mail. If the posted message does not exist in the sender's account, the plug-in 350 determines that the e-mail is spoofed.

A first example of a situation involving the operations described with respect to FIG. 2 is when a broadcast e-mail is sent from a company to individuals. In this example, the mail sending device 100 used by a company sends an e-mail to a plurality of mail receiving devices used by individuals via mail relay server 200. While FIG. 2 depicts a single mail receiving device, the number of mail receiving devices is not a limitation of the present disclosure. The mail relay server 200 posts a hash value of a predetermined portion of the e-mail to a public account of the company. Even in distribution of e-mails to a large number of individuals, since contents of the e-mails are the same, posting of one hash value by the mail relay server 200 is sufficient to enable the mail receiving devices to determine whether the e-mail has been tampered with. If a difference between a time when the hash value is posted by the mail relay server 200 and a time when the e-mail is received by the mail receiving devices is too large, the plug-ins of the mail receiving devices (i.e., a plurality of plug-ins 350) determine that the e-mail has been tampered with.

A second example of a situation involving the operations described with respect to FIG. 2 is when an e-mail is sent to individuals using a private mailing list. In this example, the mail relay server 200 posts a hash value of a predetermined portion of the e-mail to a private account of the mailing list. To check the hash value posted to the private account, the plug-in 350 logs in to the message posting service.

A third example of a situation involving the operations described with respect to FIG. 2 is when an e-mail is privately sent from a company or an individual to another individual. In this case, the mail relay server 200 posts a hash value of a predetermined portion of the e-mail to a private account of the company or the individual as a sender.

If a company is divided into a plurality of departments, a receiver may request that each of the plurality of departments respectively send an e-mail with a keyword that is indicative of the department. Accordingly, even if the receiver configures a single e-mail address in a mailer software for receiving the e-mail, the mailer software can identify the department as a sender of the e-mail, and can sort the e-mail to a folder, or another repository of information, corresponding to the department if the predetermined portion includes the keyword. Since a keyword indicative of a department is added to the predetermined portion to be hashed (e.g., to header information or the body of the e-mail) the keyword is put into the hash value posted to the private account of the company. Thus, even if the company has a single private account, the mail receiving device 300 can identify the department as a sender of the e-mail corresponding to the hash value. In the third example described above with respect to FIG. 2, the receiver is an individual and therefore allowed to assign a keyword of the receiver's choice to a department. The receiver may give the keyword to the department through, for example, a user interface such as a web page provided by the company. Since the keyword may leak in some cases, such a user interface enables a user to easily change the keyword. By recording a history of keywords, it is guaranteed that the keyword was correct at a point when the department was identified, even if the keyword has been changed.

Figure 3:
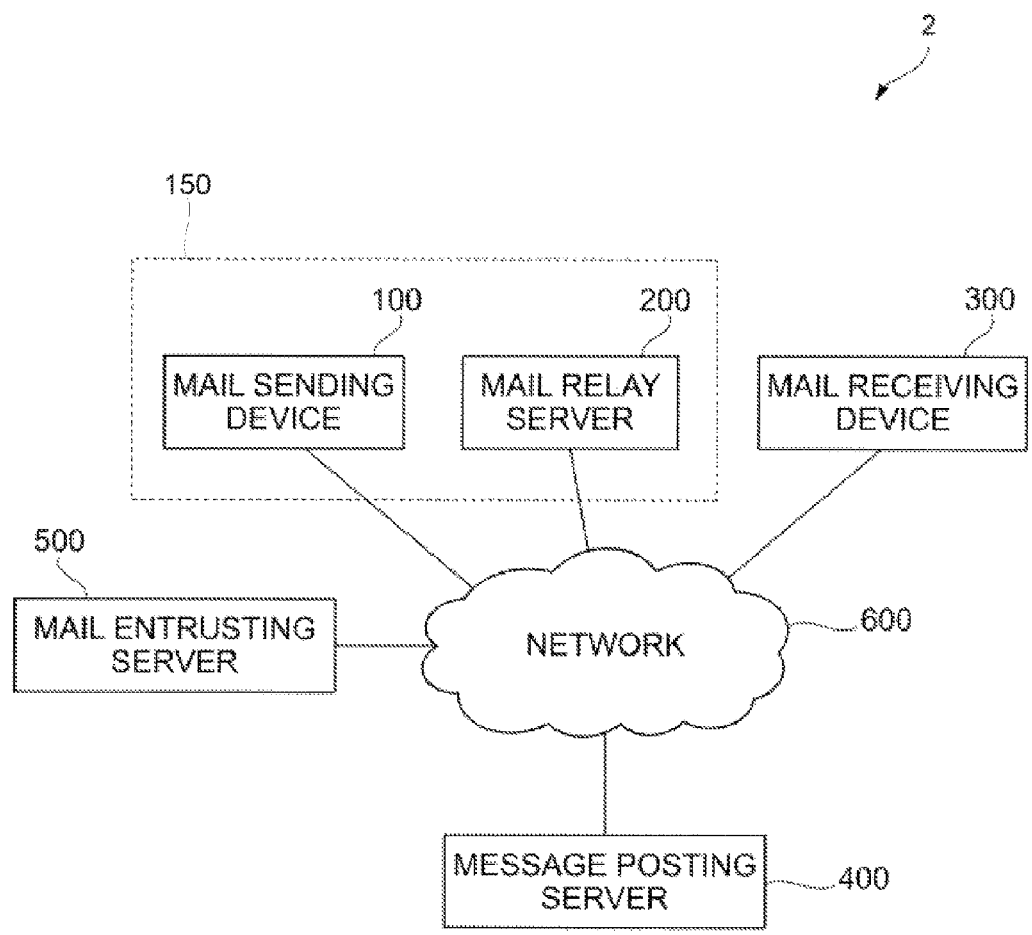
FIG. 3 is a block diagram of a computer system for validating e-mails, in accordance with an embodiment of the present disclosure.

FIG. 3 is a block diagram that depicts computer system 2, in accordance with an embodiment of the present disclosure. Today, a sender of an e-mail is often entrusted with distribution of the e-mail by an entruster. In such a case, it is undesirable that the sender posts a hash value to the entruster's account without permission of the entruster. Thus, the computer system 2 is configured so that the sender can post the hash value only when the sender is authorized by the entruster. As shown in FIG. 3, the computer system 2 includes a mail sending device 100, a mail relay server 200, a mail receiving device 300, a message posting server 400, and a network 600, as described with respect to FIG. 1. The computer system 2 also includes a mail entrusting server 500.

The mail entrusting server 500 is a computer connected to the network 600 and used by the entruster. The mail entrusting server 500 causes the hash value to be posted to the entruster's account in two manners. In the first manner, the mail entrusting server 500 provides the mail relay server 200 with the entruster's account information such as the entruster's ID and password, so that the mail relay server 200 can log in to the message posting service and post the hash value to the entruster's account. In the second manner, the mail entrusting server 500 logs in to the message posting service using the entruster's account information, and posts, to the entruster's account, the hash value received from the mail relay server 200. In FIG. 3, the mail entrusting server 500 is depicted outside the dashed line representing the boundary of a domain 150 including the mail sending device 100 and the mail relay server 200, but the mail entrusting server 500 is not necessarily provided outside the domain. In some embodiments, such as embodiments in which the first manner is applicable, the mail entrusting server 500 is inside the domain 150 to indicate that the mail relay server 200, the mail sending device 100, and the mail entrusting server 500 are owned and/or used by the same entity.

Figure 4:
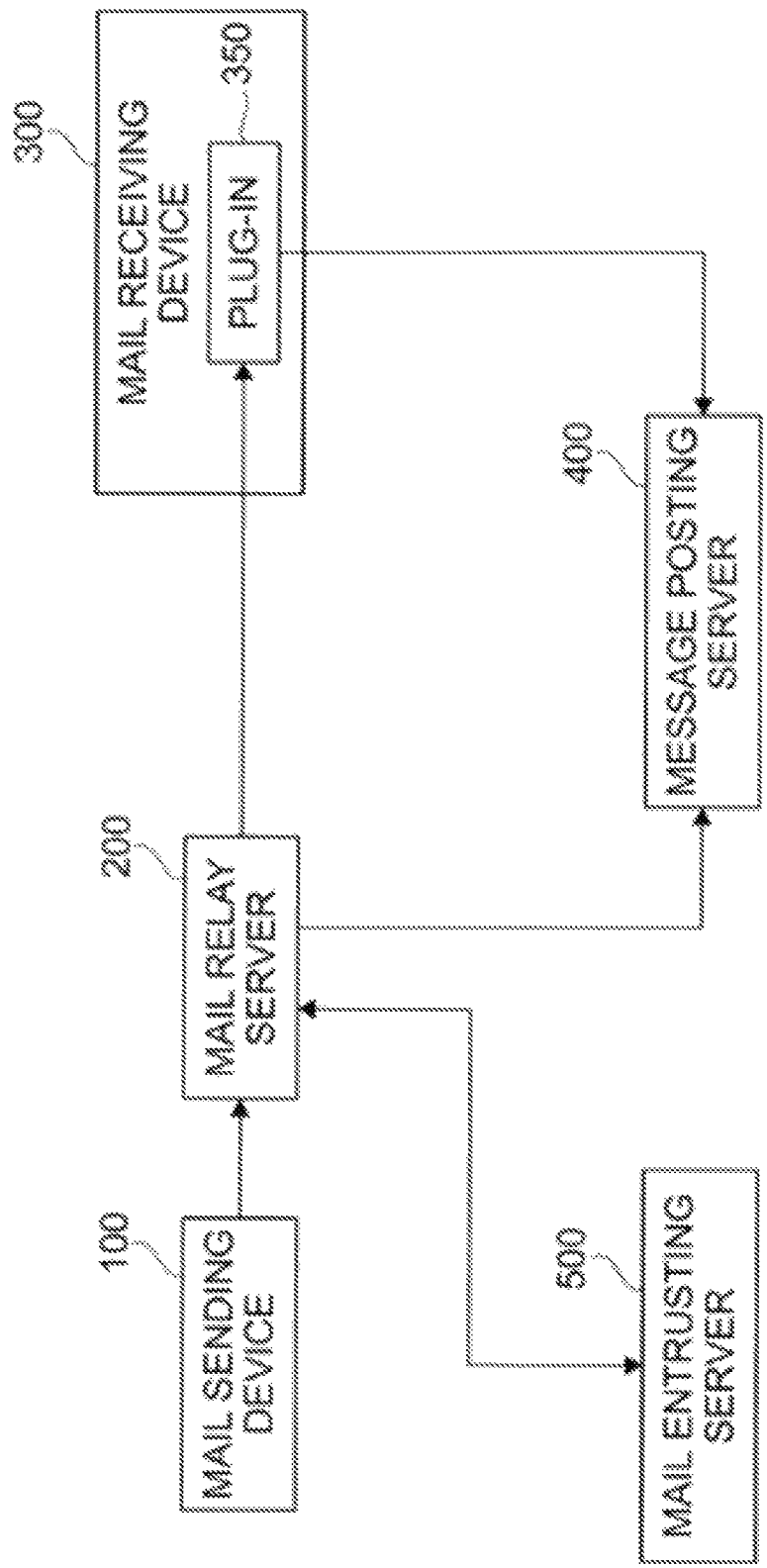
FIG. 4 is a block diagram that depicts various transfers of information within the embodiment depicted in FIG. 3, in accordance with an embodiment of the present disclosure.

FIG. 4 is a block diagram that depicts various transfers of information in accordance with embodiments where the mail relay server posts the hash value to the message posting server, in accordance with an embodiment of the present disclosure. In one example of the embodiment depicted in FIG. 4, a broadcast e-mail is sent from an entrusted sender (e.g., an entity the controls the domain 150) to individuals. The entruster provides the entrusted sender with the account information including the entruster's ID and password of the message posting service. The mail sending device 100 sends an e-mail addressed to the mail receiving device 300 in response to a request of the entrusted sender, and the mail relay server 200 receives the e-mail. The mail relay server 200 accesses the mail entrusting server 500 (e.g., a server owned and/or managed by the entruster) and gets the account information. The mail relay server 200 logs in to the message posting service on the message posting server 400 using the account information, and posts a hash value of a predetermined portion of the e-mail to the entruster's account. The predetermined portion includes the header information of the e-mail, and also includes the subject and the body of the e-mail. The message posting server 400 holds the hash value after recording a time of posting. The mail relay server 200 sends the e-mail to the mail receiving device 300, and the mail receiving device 300 receives the e-mail.

Mail receiving device 300 determines whether or not the e-mail has been tampered with. In various embodiments, the determinations is be performed by a plug-in, an add-on, or another type of software that installed in the mail receiving device 300. To determine if the e-mail has been tampered with, the plug-in 350 calculates a hash value of the predetermined portion of the e-mail, and compares this calculated hash value with the posted hash value. If the hash values are different from each other, the plug-in 350 determines that the e-mail has been tampered with. In some embodiments, the plug-in 350 may also evaluate a difference between a time when the hash value is posted to the message posting server 400 and a time when the e-mail is received by the mail receiving device 300. If the difference exceeds a time threshold set in advance, the plug-in 350 determines that the e-mail has been tampered with. If the entruster finds that an e-mail has been sent in the name of the entruster using an e-mail distribution list without permission, or that a contract between the entruster and the entrusted sender has expired as examples of a predetermined condition, the entruster may delete the posted message which includes the hash value from the message posting server 400. To determine if an e-mail is spoofed, the plug-in 350 checks the entruster's account on the message posting server 400 for the presence of the posted message which includes the hash value of the predetermined portion of the e-mail. If the posted message does not exist in the entruster's account, the plug-in 350 determines that the e-mail is spoofed.

Figure 5:
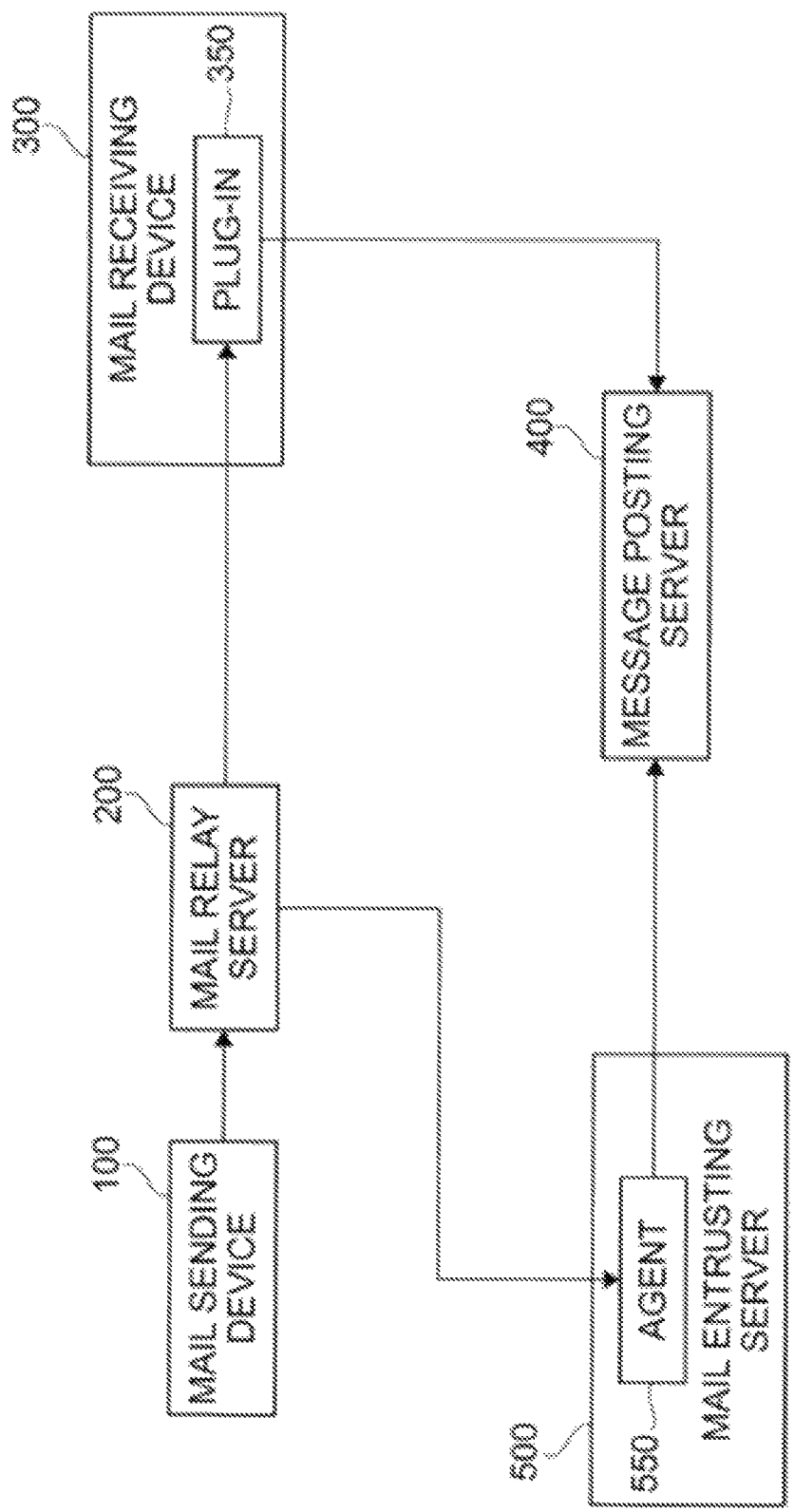
FIG. 5 is a block diagram that depicts various transfers of information within the embodiment depicted in FIG. 3, in accordance with an embodiment of the present disclosure.

FIG. 5 is a block diagram that depicts various transfers of information in accordance with embodiments where the mail entrusting server posts the hash value to the message posting server. In one example of the embodiment depicted in FIG. 5, a broadcast e-mail is sent from an entrusted sender to individuals. The mail sending device 100 sends an e-mail addressed to the mail receiving device 300 in response to a request of the entrusted sender, and the mail relay server 200 receives the e-mail. The mail relay server 200 sends a hash value of a predetermined portion of the e-mail to an agent 550 of the mail entrusting server 500. The predetermined portion includes header information of the e-mail, and also includes the subject and the body of the e-mail. The agent 550 logs in to the message posting service on the message posting server 400 using account information including the entruster's ID and password of the message posting service, and posts the hash value to the entruster's account. The message posting server 400 holds the hash value after recording a time of posting. The mail relay server 200 sends the e-mail to the mail receiving device 300, and the mail receiving device 300 receives the e-mail.

The mail receiving device 300 determines whether or not the e-mail has been tampered with. In various embodiments, the determination is performed by a plug-in (e.g., the plug-in 350), an add-on, or type of software installed on the mail receiving device 300. To determine if the e-mail has been tampered with, the plug-in 350 calculates a hash value of the predetermined portion of the e-mail, and compares this calculated hash value with the posted hash value. If the hash values are different from each other, the plug-in 350 determines that the e-mail has been tampered with. In some embodiments, the plug-in 350 may also evaluate a difference between a time when the hash value is posted to the message posting server 400 and a time when the e-mail is received by the mail receiving device 300. If the difference exceeds a time threshold set in advance, the plug-in 350 determines that the e-mail has been tampered with. In the embodiment depicted in FIG. 5, upon receiving the hash value from the mail relay server 200, the mail entrusting server 500 may choose not to post the hash value to the entruster's account, if the entruster finds that an e-mail corresponding to the hash value is to be sent in the name of the entruster using an e-mail distribution list without permission, or that a contract between the entruster and the entrusted sender has expired as examples of a predetermined condition. To determine whether or not the e-mail is spoofed, the plug-in 350 checks the entruster's account on the message posting server 400 for the presence of the posted message which includes the hash value of the predetermined portion of the e-mail. If the posted message does not exist in the entruster's account, the plug-in 350 determines that the e-mail is spoofed.

FIG. 6 depicts one example of predetermined header information, in accordance with an embodiment of the present disclosure. In the example depicted in FIG. 6, each of plural Mail Transfer Agents (MTAs) which relay the e-mail adds data such as an identification of the device, a time of relaying and other types of data to the top of data already written by the former-stage MTA. Information in a sender data field 701 indicates an identification of the mail sending device 100. Information in a date data field 702 indicates a time when the mail sending device 100 sends the e-mail. In FIG. 6, the sender data field 701 and the date data field 702 show that the mail sending device 100 sent the e-mail at Sun, 23 Mar. 2014 11:42:16 +0900 (Sun, 23 Mar. 2014 2:42:16 GMT). A relay server data field 703 indicates an identification of the mail relay server 200 which relays the e-mail first. A relay date data field 704 indicates a time when the mail relay server 200 relays the e-mail. In FIG. 6, the relay server data field 703 and the relay date data field 704 show that the mail relay server 200 relays the e-mail at Sat, 22 Mar. 2014 19:42:16-0700 (Sun, 23 Mar. 2014 2:42:16 GMT). A recipient data field 705 indicates an identification of the mail receiving device 300. A Simple Mail Transfer Protocol (SMTP) server data field 706 indicates an identification of an SMTP server which receives the e-mail at a stage prior to receipt of the e-mail by the mail receiving device 300. A date data field 707 indicates a time when the mail receiving device 300 receives the e-mail. In FIG. 6, the SMTP server data field 706 and the date data field 707 show that the mail receiving device 300 receives the e-mail by SMTP at Sat, 22 Mar. 2014 19:43:18-0700 (Sun, 23 Mar. 2014 2:43:18 GMT).

In the header information, a title and a body of the e-mail, only information within the recipient data field 705, SMTP server data field 706, and date data field 707 cannot be tampered with. Only the time which the mail receiving device 300 adds into the header information is reliable. Each MTA other than the mail receiving device 300 can tamper with the time of sending. Thus, it is theoretically possible to tamper with an e-mail and post, to the message posting service, a hash value corresponding to the e-mail before tampering. However, the tampering is considered to be practically impossible in a short time of a few minutes.

Figure 7:
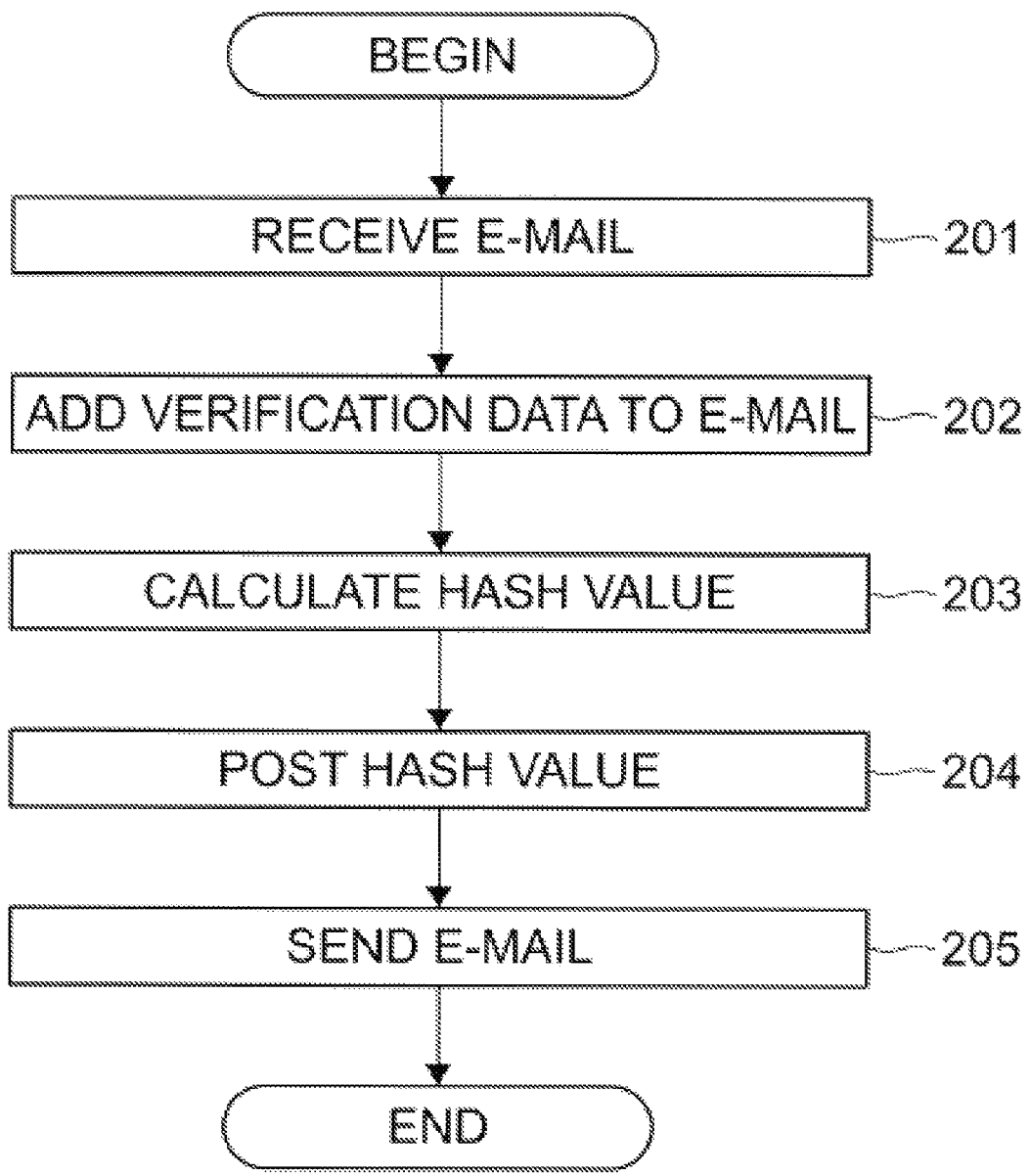
FIG. 7 is a flowchart that depicts operations of a mail relay server, in accordance with an embodiment of the present disclosure.

FIG. 7 is a flowchart operations of the mail relay server 200, in accordance with an embodiment of the present disclosure.

In the embodiment depicted in FIG. 7, the mail relay server 200 receives an e-mail that is addressed to the mail receiving device 300, which is sent by a sender of the e-mail from the mail sending device 100 (step 201). In some embodiments (e.g., the embodiment described with respect to FIG. 4), the mail relay server 200 receives an entruster's account information in addition to the e-mail in step 201.

Mail relay server 200 adds verification data to the header information of the e-mail (step 202). In embodiments like the one depicted in FIG. 6, a time stamp in the relay date data field 704 corresponds to the verification data. Alternatively, the mail relay server 200 can add random characters as the verification data to the e-mail. If the plug-in 350 seeks a hash value not using the verification data but using a "Date" header, the mail relay server 200 may skip this step.

Mail relay server 200 calculates a hash value of a predetermined portion including the header information of the e-mail (step 203).

The mail relay server 200 posts the hash value to a posting destination (step 204). In various embodiments, "posting the hash value" includes "requesting that another device post the hash value," as described with respect to the embodiment depicted in FIG. 5. In embodiments like the one described with respect to FIG. 2, the posting destination may be the sender's account. In embodiments like the ones described with respect to FIGS. 4 and 5, the posting destination may be the entruster's account.

Mail relay server 200 sends the e-mail (step 205).

Figure 8:
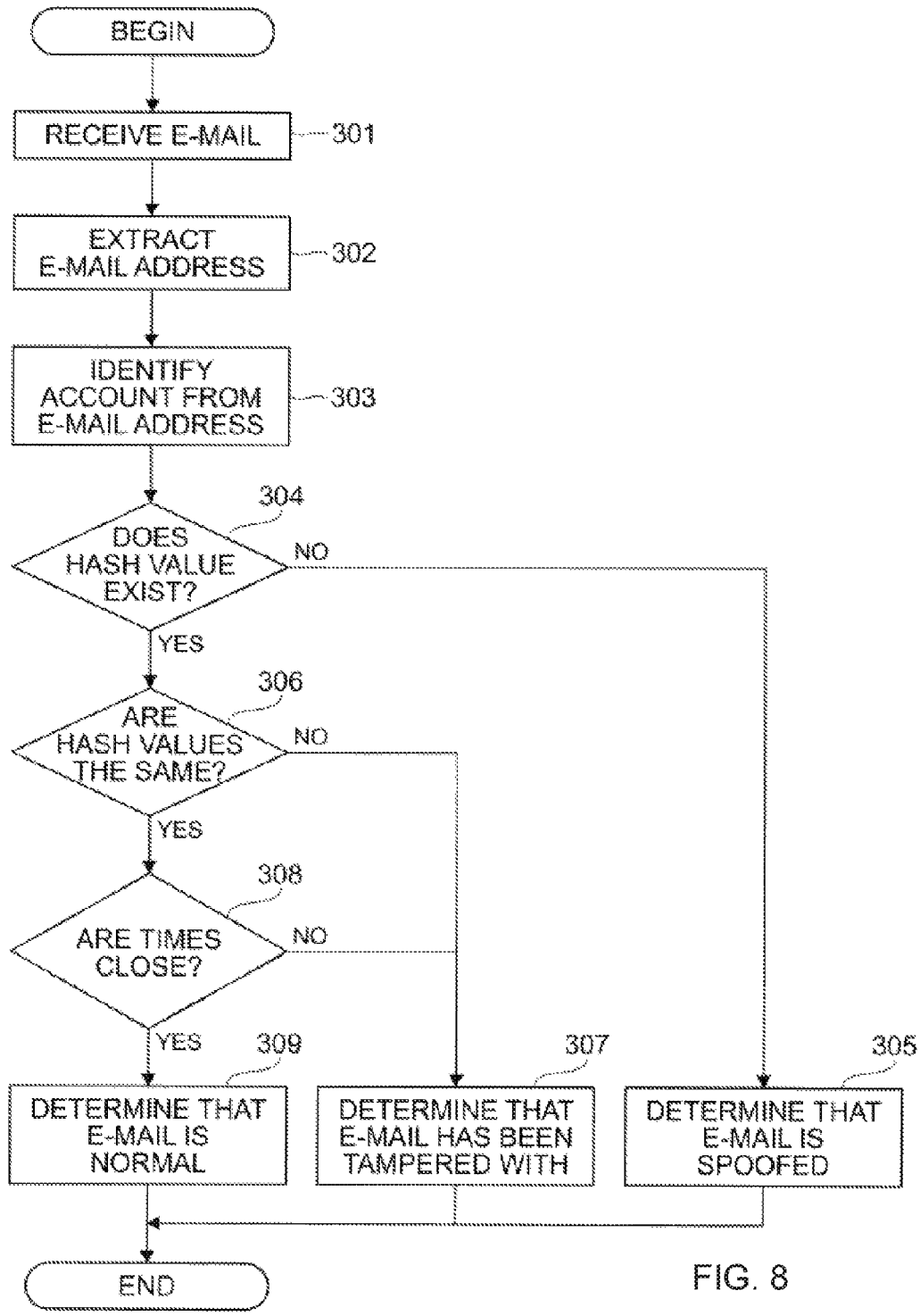
FIG. 8 is a flowchart that depicts operations of a mail receiving device, in accordance with an embodiment of the present disclosure.

FIG. 8 is flowchart that depicts operations of the mail receiving device 300 for validating e-mails, in accordance with an embodiment of the present disclosure.

Mail receiving device 300 receives the e-mail sent by the mail relay server 200 (step 301). More specifically, a mailer software of the mail receiving device 300 receives the e-mail. The plug-in 350 monitors the e-mail to be received by the mailer software, and in response to receipt of the e-mail by the mailer software, executes various combinations of steps 302 to 309 to validate the e-mail, as described herein.

The plug-in 350 extracts an e-mail address from the header information of the e-mail (step 302). In the embodiment described with respect to FIG. 2, the e-mail address may be the sender's e-mail address. In this embodiment, the plug-in 350 extract the e-mail address from the sender data field 701 of FIG. 6. In the embodiments described with respect to FIGS. 4 and 5, the e-mail address may be the entruster's e-mail address. In such embodiments, the plug-in 350 extracts the e-mail address from a "Reply-To" header (not shown).

The plug-in 350 identifies an account of the message posting service corresponding to the e-mail address (step 303). The plug-in 350 identifies the account, for example, with reference to the correspondence table (not shown) containing a correspondence between each e-mail address and an account of a user who has a corresponding e-mail address. The plug-in 350 may create and hold in advance the correspondence table in response to an input by a user. In the embodiments described with respect to FIGS. 4 and 5, the correspondence table may be configured to include an account and an e-mail address of the entruster and not to include an account and an e-mail address of the entrusted sender. Alternatively, if the message posting service provides a function in which an account is retrieved on the basis of the e-mail address, the plug-in 350 may identify the account by using the function.

The plug-in 350 determines whether or not an appropriate hash value exists in the account (step 304). In various embodiments, the plug-in 350 queries the message posting server 400 to determine whether or not an appropriate hash value exists. In such embodiments, the plug-in 350 receives a response from the message posting server 400, and based on the response, determines whether an appropriate hash value is posed to the account of the sender, as described herein. In some embodiments, the plug-in 350 seeks, as the appropriate hash value, a hash value corresponding to the verification data added at step 202 in FIG. 6. In other embodiments, the plug-in 350 seeks, as the appropriate hash value, a hash value corresponding to a time of posting around a time of sending or receipt. Note that, in some message posting services (e.g., Twitter®), the time of posting is recorded by minutes, but it is possible calculates elapsed seconds using tweet ID. In the header information depicted in FIG. 6, the time of receipt or the time of sending may be recorded in the date data field 702. In some embodiments, the plug-in 350 seeks messages posted within one or two minutes of a time corresponding to a "Date" header in the date data field 702, and extract a message including a hash value from the messages. In the header information depicted in FIG. 6, the time corresponding to the "Date" header is Sun, 23 Mar. 2014 11:42:16 +0900 (Sun, 23 Mar. 2014 2:42:16 GMT). In this example, the plug-in 350 checks messages posted between Sun, 23 Mar. 2014 2:42 GMT and Sun, 23 Mar. 2014 2:43 GMT.

If an appropriate hash value does not exist in the account, the plug-in 350 determines that the e-mail is spoofed (step 305).

If, at step 304, an appropriate hash value exists in the account, the plug-in 350 determines whether or not a first hash value and a second hash value are the same (step 306). The first hash value is the appropriate hash value existing in the account. The second hash value is calculated by hashing the predetermined portion of the e-mail. If the first and second hash values are not the same, the plug-in 350 determines that the e-mail has been tampered with (step 307).

If, at step 306, the first and second hash values are the same, the plug-in 350 determines whether or not a difference between a first time and a second time is less than a threshold amount of time (step 308). The first time is a time when the appropriate hash value is posted to the account (i.e., a time of posting). The second time is a time when the mail receiving device 300 receives the e-mail (i.e., a time of receipt). If the difference between the times is not less than the threshold amount of time, the plug-in 350 determines that the e-mail has been tampered with (step 307).

If, at step 308, the difference in times is not less than the threshold, the plug-in 350 determines that the e-mail is normal/authentic (step 309). Upon determining that the e-mail is authentic in this manner, the e-mail may be sorted to a folder by a sorting function.

In the flowchart depicted in FIG. 7, it is assumed that the mail relay server 200 posts the hash value, but the operation of the mail relay server 200 is not limited thereto. Although the mail relay server 200 requests the mail entrusting server 500 to post the hash value, the mail entrusting server 500 may choose not to post the hash value to the message posting server 400, as described with respect to the embodiment depicted in FIG. 5. In this case, at step 304 in the flowchart of FIG. 8, the plug-in 350 may also determine whether a posted message including the hash value does not exist in the message posting server 400 because the message has not been posted to the message posting server 400. Further, after the operation represented by the flowchart of FIG. 8, the posted message including the hash value may be deleted from the message posting server 400, as explained with respect to the embodiments depicted in FIGS. 2 and 4. In this case, at a predetermined time after the operation represented by the flowchart of FIG. 8, the plug-in 350 may determine whether the posted message including the hash value does not exist in the message posting server 400 because the message has been deleted from the message posting server 400.

Also, in the exemplary embodiments, it is assumed that the sender of the e-mail uses a mailer software installed in the mail sending device 100 and the receiver of the e-mail uses a mailer software installed in the mail receiving device 300, but the present invention is not limited thereto. Either one of the sender and the receiver may use a web e-mail system. The web e-mail system is an e-mail system in which e-mails can be accessed through a web browser without installation of any mailer software. The present disclosure is applicable to the computer system in which the receiver uses the web e-mail system, on condition that a built-in module of the web e-mail system has functions of the plug-in 350. Also, the present disclosure is applicable to the computer system in which the sender uses the web e-mail system, on condition that the sender uses the mail relay server 200. Furthermore, the web e-mail system may include both of functions of the mail relay server 200 and the built-in module.

Further, the receiver of the e-mail can check a hash value posted to the message posting service, from a web browser. Therefore, even if a plug-in or an add-on of the mailer software is not installed, the receiver may determine whether the e-mail has been tampered with, by manually calculating a hash value corresponding to the e-mail.

A hash value posted to the message posting service may be tampered with in some cases. In such cases, the hash value may be posted to plural message posting services (e.g., Twitter® and other services). This makes it possible to find, in any of the plural message posting services, the hash value which has not been tampered with.

Figure 9:
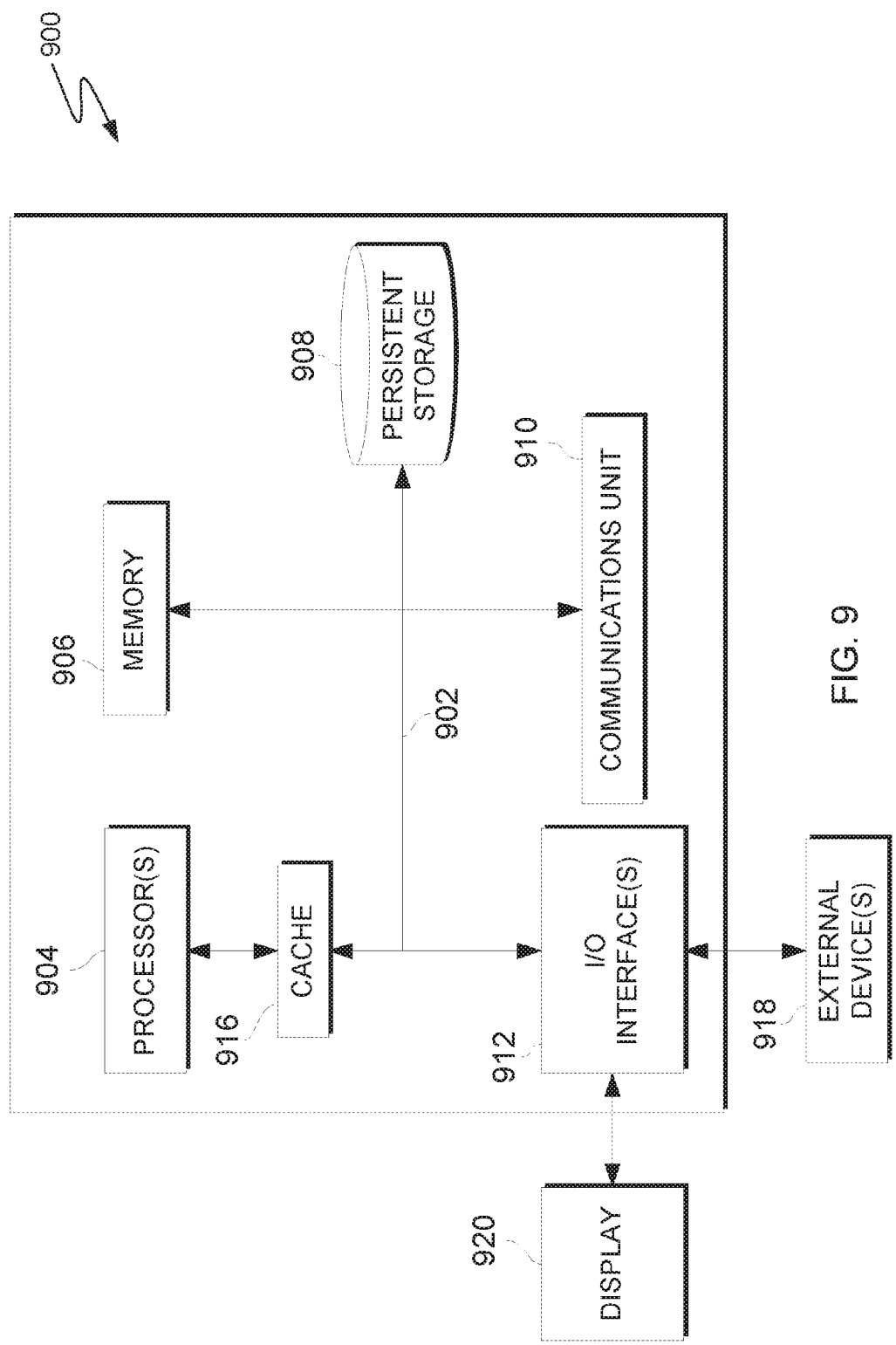
FIG. 9 is a block diagram of components of a computing device executing operations for validating e-mails, in accordance with an embodiment of the present disclosure.

FIG. 9 depicts computer system 900. Computer system 900 is an example of a system that is capable of executing the plug-in 350. Computer system 900 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of processors 904 by holding recently accessed data and data near accessed data from memory 906.

Program instructions and data used to practice embodiments of the present invention may be stored in persistent storage 908 for execution by one or more of the respective processors 904 via cache 916 and one or more memories of memory 906. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Program instructions and data used to practice embodiments of the present invention may be downloaded to persistent storage 908 through communications unit 910.

I/O interface(s) 912 allows for input and output of data with other devices that may be connected to each computer system. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention can be stored on such portable computer readable storage media and can be loaded onto persistent storage 908 via I/O interface(s) 912. I/O interface(s) 912 also connect to a display 920.

Display 920 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for validating e-mails, the method comprising:
    receiving, by one or more computer processors, an e-mail;
    determining, by one or more computer processors, a sender of the e-mail;
    identifying, by one or more computer processors, an account of a message posting service, wherein the account is associated with the sender;
    querying, by one or more computer processors, the message posting service for a first hash value corresponding to the e-mail based, at least in part, on the account;
    receiving, by one or more computer processors, a response from the message posting service;
    determining, by one or more computer processors, whether the account includes the first hash value based, at least in part, on the response;
    validating, by one or more computer processors, the e-mail based, at least in part, on the response from the message posting service
    determining, by one or more computer processors, a time of receipt of the e-mail;
    determining, by one or more computer processors, a time of posting of the first hash value; and
    determining, by one or more computer processors, a duration of time between the time of receipt and the time of posting.

2. The method of claim 1, wherein validating the e-mail comprises:
    in response to determining that the account includes the first hash value, calculating, by one or more computer processors, a second hash value based, at least in part, on one or more predetermined portions of the e-mail; and
    determining, by one or more computer processors, that the first hash value is equal to the second hash value, and, in response, determining, by one or more computer processors, that the e-mail is authentic.

3. The method of claim 1, wherein validating the e-mail comprises:
- in response to determining that the account includes the first hash value, calculating, by one or more computer processors, a second hash value based, at least in part, on one or more predetermined portions of the e-mail; and
- determining, by one or more computer processors, that the first hash value is not equal to the second hash value, and, in response, determining, by one or more computer processors, that the e-mail has been tampered with.

4. The method of claim 1, wherein the first hash value is posted to the message posting service via the account associated with the sender, and wherein the first hash value is based, at least in part, on the one or more predetermined portions of the e-mail.

5. The method of claim 1, wherein querying the message posting service for the first hash value is based, at least in part, on verification data contained in the e-mail.

6. The method of claim 1, wherein querying the message posting service for the first hash value is based, at least in part, on a time of receipt of the e-mail.

7. The method of claim 1, wherein validating the e-mail comprises:
- determining, by one or more computer processors, that the first hash value is not posted to the account based on a response to querying the message posting service and, in response, determining, by one or more computer processors, that the e-mail is spoofed.

8. The method of claim 1, wherein validating the e-mail comprises:
- determining, by one or more computer processors, that the first hash value is equal to the second hash value;
- determining, by one or more computer processors, that the duration of time between the time of receipt and the time of posting is less than a threshold duration of time; and
- determining, by one or more computer processors, that the e-mail is authentic.

9. The method of claim 1, wherein validating the e-mail comprises:
- responsive to determining, by one or more computer processors, that the duration of time between the time of receipt and the time of posting is equal to or greater than the threshold duration of time, determining, by one or more computer processors, that the e-mail has been tampered with.

* * * * *